（12） United States Patent
Boxer

(10) Patent No.: US 10,186,061 B1
(45) Date of Patent: Jan. 22, 2019

(54) PROXIMATE-TILE-TYPE-BASED MAP GENERATION

(71) Applicant: ELECTRONIC ARTS INC., Redwood City, CA (US)

(72) Inventor: Nate Boxer, Oakland, CA (US)

(73) Assignee: Electronic Arts Inc., Redwood City, CA (US)

( * ) Notice: Subject to any disclaimer, the term of this patent is extended or adjusted under 35 U.S.C. 154(b) by 532 days.

(21) Appl. No.: 13/739,869

(22) Filed: Jan. 11, 2013

(51) Int. Cl.
*G06T 11/40* (2006.01)
*G06T 11/00* (2006.01)
*G06T 11/20* (2006.01)
*A63F 13/00* (2014.01)

(52) U.S. Cl.
CPC ............ *G06T 11/40* (2013.01); *G06T 11/001* (2013.01); *G06T 11/206* (2013.01); *A63F 13/00* (2013.01)

(58) Field of Classification Search
None
See application file for complete search history.

(56) References Cited

U.S. PATENT DOCUMENTS

| 5,239,596 | A | * | 8/1993 | Mahoney | 382/180 |
| 6,123,619 | A | | 9/2000 | Tokita et al. | 463/43 |
| 6,319,129 | B1 | | 11/2001 | Igarashi et al. | 463/31 |
| 6,961,055 | B2 | | 11/2005 | Doak et al. | 345/419 |
| 7,414,629 | B2 | | 8/2008 | Santodomingo et al. | 345/582 |
| 7,728,837 | B2 | * | 6/2010 | Szymanski et al. | 345/473 |
| 9,336,618 | B1 | | 5/2016 | Fontaine et al. | |
| 9,626,380 | B1 | | 4/2017 | Fontaine et al. | |
| 2001/0045949 | A1 | | 11/2001 | Chithambaram et al. | 345/418 |
| 2003/0058238 | A1 | * | 3/2003 | Doak et al. | 345/419 |
| 2004/0004698 | A1 | * | 1/2004 | Silverbrook et al. | 355/18 |
| 2005/0264576 | A1 | | 12/2005 | Sommers | |
| 2007/0206023 | A1 | * | 9/2007 | Street | A63F 13/10 345/582 |
| 2009/0003698 | A1 | * | 1/2009 | Milward et al. | 382/171 |
| 2009/0005140 | A1 | | 1/2009 | Rose et al. | 463/7 |

(Continued)

OTHER PUBLICATIONS

Yapa et al, "A Connected Component Labeling Algorithm for Grayscale Images and Application of the Algorithm on Mammograms", ACM Proc. SAC'07, pp. 146-152, 2007.*

(Continued)

*Primary Examiner* — Kee M Tung
*Assistant Examiner* — Patrick F Valdez
(74) *Attorney, Agent, or Firm* — Knobbe, Martens, Olson & Bear, LLP

(57) ABSTRACT

An approach to facilitating proximate-tile-type-based map generation is provided. Tile type information that indicates tile types for map tiles of a map to be generated may be received. One or more proximate tile types may be determined for individual ones of the map tiles based on the tile types. The proximate tile types may include one or more of the tile types of other ones of the map tiles that are proximate the individual map tiles on the map. Level information that indicates levels for the individual map tiles may be determined based on the proximate tile types of the individual map tiles. The map may be generated based on the tile type information and the level information. In some implementations, the tile type information may be received as a graphic representation having colors that indicate the tile types.

20 Claims, 3 Drawing Sheets

(56) References Cited

U.S. PATENT DOCUMENTS

| | | | |
|---|---|---|---|
| 2009/0244074 A1 | 10/2009 | Montrym et al. | 345/522 |
| 2010/0073391 A1* | 3/2010 | Horowitz et al. | 345/581 |
| 2010/0298050 A1 | 11/2010 | Taraschuk et al. | 463/31 |
| 2011/0206253 A1* | 8/2011 | Averbuch | G06K 9/342 382/128 |
| 2011/0219009 A1 | 9/2011 | Rosenfeld et al. | 707/743 |
| 2012/0095945 A1 | 4/2012 | Jones | |
| 2012/0268468 A1* | 10/2012 | Elenzil | 345/441 |

OTHER PUBLICATIONS

Paquette A., "Chapter 2 CG Terrain", Chapter 2, Computer Graphics for Artists II: Environment and Characters, Springer-Verlag, 2009.*

Cohen et al, "Wang Tiles for image and texture generation", ACM TOG, 22(3), pp. 287-294, Jul 2003.*

Young S. "Project Hex Part 3—Things Get Hilly", [online], [retrieved May 29, 2016], http://www.shamusyoung.com/twentysidetale/?p=9686, Nov. 2010.*

Johnson et al, "Cellular automata for real-time generation of infinite cave levels", Proc. of the 2010 Workshop on Procedural Content Generation in Games, ACM, 2010.*

Kerssemakers et al, "A procedural procedural level generator generator", Computational Intelligence and Games (CIG), 2012 IEEE Conf. on IEEE, 2012.*

Periera G.D.G. "Adaptive Map Generation for Turn-based Strategic Multiplayer Browser Games", 2009.*

Guomundsson T. "Generating multi player maps through multi objective evolution", MS Thesis, Tech. Univ. of Denmark, 2012.*

Young S., "Project Hex Part 3—Things Get Hilly", [online], [retrieved Nov. 30, 2016], https://web.archive.org/webl20101114213824/http://www.shamusyoung.com/twentysidetale/?p=9686, Nov. 2010.*

Prince D., "Javascript—Map Tiling Algorithm", [online], [retrieved Aug. 20, 2017], https://stackoverflow.com/questions/8901987/map-tiling-algorithm, Jan. 2012.*

Lagae et al, "An Alternative for Wang Tiles: Colored Edges versus Colored Corners", ACM Transactions on Graphics, 25(4), Oct. 2006, pp. 1442-1459.*

"Procedural Level Generation Using Occupancy-Regulated Extension" by Mawhorter et al. IN: Computational Intelligences and Games (2010). Available at: IEEE, 8 pages.

"Rendering Massive Terrains Using Chunked Level of Detail Control", by Ulrich, Thatcher. IN: Oddworld Inhabitants (2002). Available at: http://tulrich.com/geekstuff/sig-notes.pdf. Available online at least as early as 2004 as evidenced by Wayback Machine: http://web.archive.org/web/20040515000000*/http://tulrich.com/geekstuff/sig-notes.pdf, 14 pages.

"Tile-Based Texture Mapping on Graphics Hardware", by Wei, Li-Yi. IN: Graphics Hardware (2004). Available at: http://graphics.stanford.edu/papers/tile_mapping_gh2004/final/paper_final.pdf, 10 pages.

"Tile Engine" by Wikipedia. Revision of Jan. 23, 2011. Available at: http://en.wikipedia.org/w/index.php?title=Tile_engine&oldid=409645739, 2 pages.

"Tiling Triangular Meshes" by Iu, Ming-Yee. IN: EPFL I&C. Available at http://www.user00.com/my2iu/workshop/tile/tile.pdf (2007). Last modified status of 2007 available at: http://www.user00.com/my2iu/workshop/tile/, 6 pages.

Bernardin et al., "Interactive Mapping on 3-D Terrain Models". IN: G3, vol. 7, No. 10, 2006; available at: Wiley; 12 pages.

Deng et al., "Seamless Rendering of Large Scale Terrain". IN: Advanced Engineering Forum, vols. 6-7, pp. 1026-1030, Sep. 2012; available at http://www.scientific.net/AEF.6-7.1026, 6 pages.

"Real-time terrain mapping," by Bernardin et al. IN: Scientific Visualization: Challenges for the Future, IEEE Computer SocietyPress, Los Alamitos, California (2008), pp. 275-288. Available at: IEEE.

"GPU-Friendly High-Quality Terrain Rendering," by Scheider & Westermann. IN: J'nl WSCG 2006, vol. 14, No. 1-3, pp. 49-56. Available at: researchgate.net.

* cited by examiner

PROXIMATE-TILE-TYPE-BASED MAP GENERATION

FIELD OF THE DISCLOSURE

This disclosure relates generally to proximate-tile-type-based map generation.

BACKGROUND

Typically, maps for virtual spaces may be generated by simply distributing map tiles in random positions of a map. Among other issues, such random distribution of map tiles to generate maps may reduce realism of the virtual spaces associated with the map. Accordingly, alternative and/or additional approaches to such a technique may be advantageous.

SUMMARY

One aspect of the disclosure relates to a system configured to facilitate proximate-tile-type-based map generation, in accordance with one or more implementations. In exemplary implementations, tile type information that indicates tile types for map tiles of a map to be generated may be received. In some implementations, the tile type information may be received as a graphic representation having colors that indicate the tile types for the map tiles of the map. One or more proximate tile types may be determined for individual ones of the map tiles based on the tile types that are indicated by the graphic representation. The proximate tile types may include one or more of the tile types of other ones of the map tiles that are proximate the individual map tiles on the map. Level information that indicates levels for the individual map tiles may be determined based on the proximate tile types of the individual map tiles. The map may be generated based on the tile type information and the level information.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate proximate-tile-type-based map generation. The computer program modules may include one or more of a tile type input module, a tile type proximity module, a level determination module, a map generation module, and/or other modules. In some implementations, the client computing platforms may be configured to execute one or more computer program modules that are the same as or similar to the computer program modules of the server(s) to facilitate proximate-tile-type-based map generation.

The tile type input module may be configured to receive tile type information that indicates tile types for map tiles of a map to be generated. The tile types may include a first tile type and a second tile type. The map tiles may include a first map tile of the first tile type and a second map tile of the second tile type that is proximate the first map tile on the map. In some implementations, the tile type input module may be configured to receive the tile type information as a graphic representation having colors that indicate the tile types. The colors may include a first color and a second color. The first color may indicate the first tile type. The second color may indicate the second tile type. As an example, the graphic representation may be an image (e.g., bitmap, pixmap, and/or other image format), a video, and/or other graphic representation.

In certain implementations, the tile types that are indicated by the tile type information may include different terrain types. The terrain types may, for instance, include a first terrain type and a second terrain type different from the first terrain type. The first tile type may include the first terrain type. The second tile type may include the second terrain type. By way of example, terrain types may include plains, deserts, forests, mountains, hills, swamps, paved roads, dirt roads, ice sheets, cities, beaches, rivers, lakes, seas, oceans, and/or other terrain types.

The tile type proximity module may be configured to determine, based on the tile type information, one or more proximate tile types of individual ones of the map tiles of the map. The proximate tile types of the individual map tiles may include one or more of the tile types of other ones of the map tiles that are proximate the individual map tiles on the map. As an example, where the tile type information indicates a first tile type for a first map tile and a second tile type for a second map tile that is proximate the first map tile on the map, the second tile type may be determined to be one of the proximate tile types of the first map tile based on a determination that the second map tile is proximate the first map tile.

In various implementations, the map may include map tile sets having the map tiles. The map tile sets may include a first map tile set and a second map tile set. The first map tile set may include one or more tiles of the first tile type. The map tiles of the first map tile set may include the first map tile. The second map tile set may include one or more tiles of the second tile type. The map tiles of the second map tile set may include the second map tile. In some implementations, the second tile type may be determined to be one of the proximate tile types of the first map tile based on a determination that the second map tile set is adjacent to the first map tile set on the map.

The level determination module may be configured to determine, based on the proximate tile types of the individual map tiles of the map, level information that indicates levels for the individual map tiles. As an example, where the tile type information indicates a first tile type for a first map tile and a second tile type for a second map tile that is proximate the first map tile on the map, a level indicated by the level information for the first map tile may, for instance, be based on a determination that the second tile type is one of the proximate tile types of the first map tile.

In certain implementations, the level determination module may be configured to determine the level information such that the levels for the individual map tiles may be based on one or more levels indicated by the level information for the other map tiles that are proximate the individual map tiles. For example, the map tiles may include the first map tile of the first tile type, the second map tile of the second tile type, and a third map tile of the first tile type. The level determination module may determine the level information such that the level for the first map tile is based on one or more of a level indicated by the level information for the second map tile or a level indicated by the level information for the third map tile.

In various implementations, the level determination module may be configured to determine level ranges for the map tiles. The level ranges may include a first range and a second range. The level determination module may be configured to determine the level information such that the levels for the individual map tiles are based on the level ranges for the individual map tiles. For example, the level indicated for the first map tile by the level information may be one of the levels within the first range determined for the first map tile. In some implementations, the level determination module may be configured such that the level ranges for the map tiles are determined based on the colors of the graphic representation received as the tile type information. A first color may indicate the first range and a second color may indicate the second range. As such, the level indicated by the level information for the first map tile may be based on a determination that the first map tile is within the first range in accordance with the first color.

The map generation module may be configured to generate the map based on the tile type information and the level information. As discussed, in certain implementations, the tile type information may be received as a graphic representation having colors that indicate the tile types. In some implementations, the graphic representation may include pixels that represent the map tiles. Individual ones of the pixels may, for instance, represent individual ones of the map tiles. The map generation module may be configured to generate the map based on the individual pixel representations of the individual map tiles. In various implementations, the map generation module may be configured to provide a user interface for presentation to a user. The user interface may be configured to facilitate modification of the generated map by the user.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
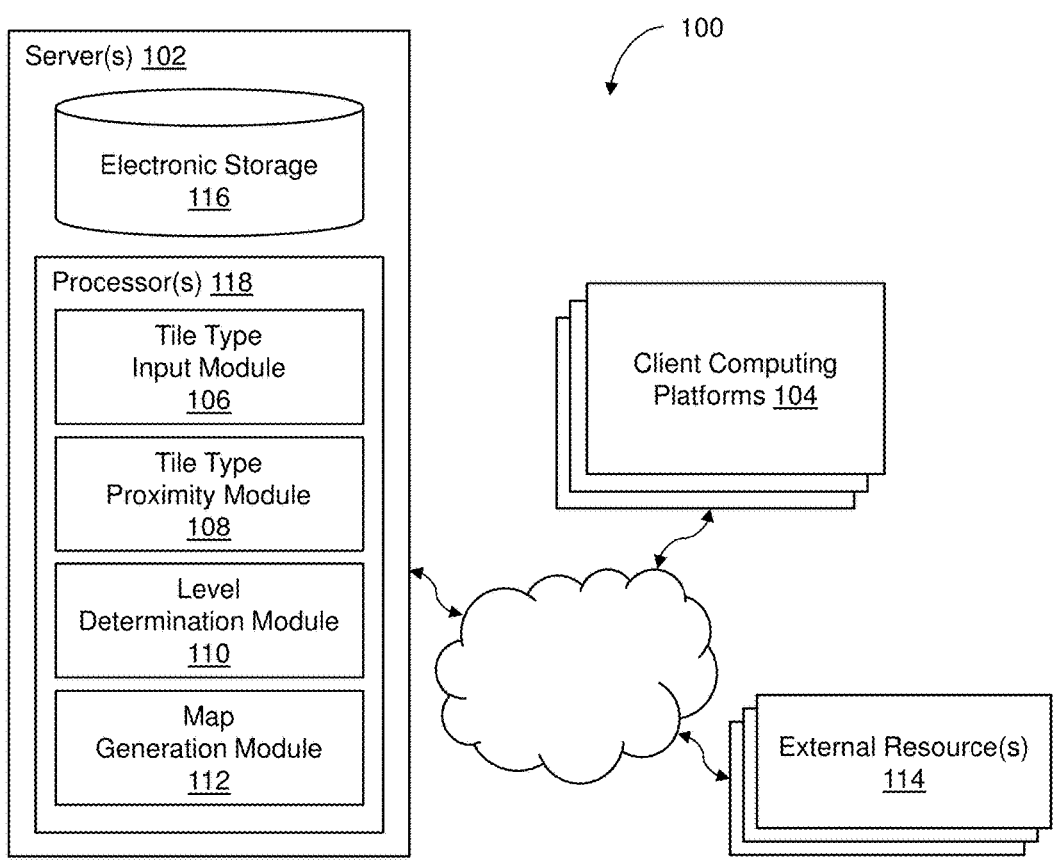
FIG. 1 illustrates a system configured to facilitate proximate-tile-type-based map generation, in accordance with one or more implementations.

FIG. 1 illustrates a system 100 configured to facilitate proximate-tile-type-based map generation, in accordance with one or more implementations. In exemplary implementations, tile type information that indicates tile types for map tiles of a map to be generated may be received. In some implementations, the tile type information may be received as a graphic representation having colors that indicate the tile types for the map tiles of the map. One or more proximate tile types may be determined for individual ones of the map tiles based on the tile types that are indicated by the graphic representation. The proximate tile types may include one or more of the tile types of other ones of the map tiles that are proximate the individual map tiles on the map. Level information that indicates levels for the individual map tiles may be determined based on the proximate tile types of the individual map tiles. The map may be generated based on the tile type information and the level information.

By way of example, a graphic representation may be manually drawn by a designer and may be provided as input to generate the map. Individual pixels or pixel sets of the graphic representation may represent the individual map tiles. As such, based on the colors of the individual pixels or pixel sets, the tiles types may be determined for the individual map tiles. A graphic representation that indicates the tile type and the levels of the individual map tiles may be generated by taking in account, for a given map tile, the tile type of the given map tile along with the tile type, the level, and/or other characteristics of proximate map tiles. The graphic representation having tile type and level indications may include variations of the original colors (e.g., different shades, patterns, etc.) from the originally-inputted graphic representation to distinguish between map tiles of the same tile type that are assigned different levels.

In one use case, mountain map tiles of a map may be indicated by red in the originally-inputted graphic representation. The graphic representation having tile type and level indications may include different shades of the original red for the mountain map tiles to distinguish among the different levels assigned to the mountain map tiles. The graphic representation having tile type and level indications may be processed to generate the map having map tiles of tiles types and levels that correspond to the tile type and level indications. A user interface may be provided to the designer to enable the designer to refine the generated map. In this way, as will be further described in detail below, proximate-tile-type-based map generation may facilitate generation of more realistic maps and/or provide other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate proximate-tile-type-based map generation. The computer program modules may include one or more of a tile type input module 106, a tile type proximity module 108, a level determination module 110, a map generation module 112, and/or other modules. In some implementations, client computing platforms 104 may be configured to execute one or more computer program modules that are the same as or similar to the computer program modules of server(s) 102 to facilitate proximate-tile-type-based map generation.

Tile type input module 106 may be configured to receive tile type information that indicates tile types for map tiles of a map to be generated. The tile types may include a first tile type and a second tile type. The map tiles may include a first map tile of the first tile type and a second map tile of the second tile type that is proximate the first map tile on the map. In some implementations, tile type input module 106 may be configured to receive the tile type information as a graphic representation having colors that indicate the tile types. The colors may include a first color and a second color. The first color may indicate the first tile type. The second color may indicate the second tile type. As an example, the graphic representation may be an image (e.g., bitmap, pixmap, and/or other image format), a video, and/or other graphic representation.

Figure 2:
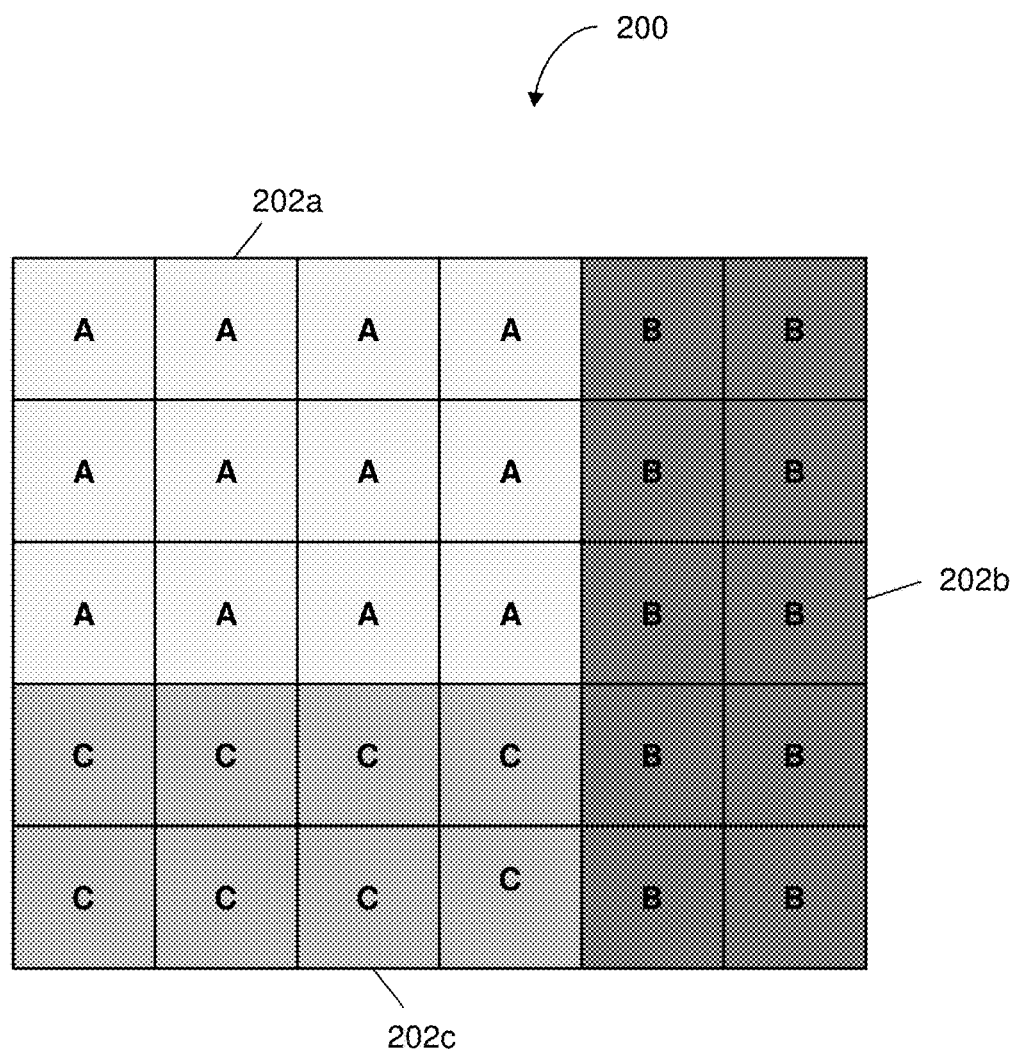
FIG. 2 illustrates a diagram of a graphic representation having colors that indicate tile type information for map tiles of a map, in accordance with one or more implementations.

Along these lines, FIG. 2 illustrates a diagram of a graphic representation 200 having colors that indicate tile type information for map tiles of a map, in accordance with one or more implementations. As shown, graphic representation 200 includes blocks 202 that represent the map tiles of the map. Each block may represent an individual pixel of graphic representation 200 or a set of pixels of graphic representation 200. As such, each pixel or each set of pixels may correspond to one of the map tiles of the map. As depicted, blocks 202a are of a color that indicates an A-type tile, blocks 202b are of a color that indicates a B-type tile, and blocks 202c are of a color that indicates a C-type tile. In one use case, a designer may manually draw graphic representation 200 and provide graphic representation 200 as an input to indicate tile type information along with other information for map tiles of a map to be generated. Other information may include indications of relative positions of the map tiles on the map, indications of level ranges of the map tiles on the map, and/or other indications relating to generation of the map.

In certain implementations, the tile types that are indicated by the tile type information may include different terrain types. The terrain types may, for instance, include a first terrain type and a second terrain type different from the first terrain type. The first tile type may include the first terrain type. The second tile type may include the second terrain type. By way of example, terrain types may include plains, deserts, forests, mountains, hills, swamps, paved roads, dirt roads, ice sheets, cities, beaches, rivers, lakes, seas, oceans, and/or other terrain types. With respect to FIG. 2, for instance, the color of blocks 202a may indicate map tiles of an A-type that include mountain terrains, the color of blocks 202b may indicate map tiles of a B-type that include lake terrains, and the color of blocks 202c may indicate map tiles of a C-type that include plain terrains.

The individual terrain types may have different terrain characteristics. Terrain characteristics may impact objects disposed within a map tile, impact objects moving through the map tile, impact a value of holding or possessing the map tile, may impact buildings built on the map tile, and/or may have other impacts in a virtual space that implements the map having the map tile. For example, a forest terrain may have terrain characteristics that facilitate defense during battle, impede attacks during battle, impede travel through a forest, require expenditure of additional resources before a building can be built (e.g., to clear the foliage), and/or other impacts. Other examples are contemplated.

As discussed below, individual map tiles may be assigned a level. The level of a given map tile may dictate the degree to which the terrain characteristics of a terrain type assigned to the given map tile are present in the given map tile. For example, a higher level may cause the terrain characteristics of the terrain type assigned to the given map tile to have greater impact than another map tile of the same terrain type but with a lower level. In some implementations, tiles of the same tile type may have different appearances from each other to denote differences in level.

Tile type proximity module 108 may be configured to determine, based on the tile type information, one or more proximate tile types of individual ones of the map tiles of the map. The proximate tile types of the individual map tiles may include one or more of the tile types of other ones of the map tiles that are proximate the individual map tiles on the map. As an example, where the tile type information indicates a first tile type for a first map tile and a second tile type for a second map tile that is proximate the first map tile on the map, the second tile type may be determined to be one of the proximate tile types of the first map tile based on a determination that the second map tile is proximate the first map tile. With respect to FIG. 2, for instance, the B-type may be determined to be a proximate tile type of one of the map tiles corresponding to one of the blocks 202a based on a determination that one of the blocks 202b is near the corresponding block 202a.

In various implementations, the map may include map tile sets having the map tiles. The map tile sets may include a first map tile set and a second map tile set. The first map tile set may include one or more tiles of the first tile type. The map tiles of the first map tile set may include the first map tile. The second map tile set may include one or more tiles of the second tile type. The map tiles of the second map tile set may include the second map tile. In some implementations, the second tile type may be determined to be one of the proximate tile types of the first map tile based on a determination that the second map tile set is adjacent to the first map tile set on the map. With respect to FIG. 2, for instance, graphic representation 200 may include three sections representing three different map tile sets A, B, and C. Map tile set A may include the map tiles corresponding to illustrated blocks 202a, map tile set B may include the map tiles corresponding to illustrated blocks 202b, and map tile set C may include the map tiles corresponding to illustrated blocks 202c. In one use case, the B-type and the C-type may be determined to be proximate tile types of one of the map tiles corresponding to one of the blocks 202a (e.g., map tiles of the map tile set A) based on a determination that map tile sets B and C are adjacent to map tile set A on the map.

Level determination module 110 may be configured to determine, based on the proximate tile types of the individual map tiles of the map, level information that indicates levels for the individual map tiles. As an example, where the tile type information indicates a first tile type for a first map tile and a second tile type for a second map tile that is proximate the first map tile on the map, a level indicated by the level information for the first map tile may, for instance, be based on a determination that the second tile type is one of the proximate tile types of the first map tile.

In certain implementations, level determination module 110 may be configured to determine the level information such that the levels for the individual map tiles may be based on one or more levels indicated by the level information for the other map tiles that are proximate the individual map tiles. In one use case, the map tiles may include the first map tile of the first tile type, the second map tile of the second tile type, and a third map tile of the first tile type. Level determination module 110 may determine the level information such that the level for the first map tile is based on one or more of a level indicated by the level information for the second map tile or a level indicated by the level information for the third map tile.

By way of example, with respect to FIG. 2, the color of blocks 202a may indicate map tiles of an A-type (e.g., mountain map tiles) that include mountain terrains, the color of blocks 202b may indicate map tiles of a B-type (e.g., lake map tiles) that include lake terrains, and the color of blocks 202c may indicate map tiles of a C-type (e.g., plain map tiles) that include plain terrains. As noted above, the level of a given map tile may dictate the degree to which terrain characteristics of a terrain type assigned to the given map tile are present in the given map tile. Thus, in one use case, the mountain map tiles of the row adjacent to the plain map tiles may be assigned levels with low elevations similar to the elevations of the plain map tiles based on a determination that the plain map tiles are adjacent map tiles (or, otherwise, proximate map tiles) of those mountain map tiles. In another use case, the mountain map tiles of the row behind the mountain map tiles of the adjacent row may be assigned levels with elevations greater than the elevations of the mountain map tiles of the adjacent row based on the levels assigned to the mountain map tiles of the adjacent row and based on the determination that the mountain map tiles of the non-adjacent row are farther away from the plain map tiles than the mountain map tiles of the adjacent row. In this way, the map generated from the level information may depict terrain that "flows" from tile to tile by taking into account (for given map tiles of the map) the tile types, the levels, and/or other characteristics of other proximate map tiles.

In various implementations, level determination module 110 may be configured to determine level ranges for the map tiles. The level ranges may include a first range and a second range. Level determination module 110 may be configured to determine the level information such that the levels for the individual map tiles are based on the level ranges for the individual map tiles. For example, the level indicated for a particular map tile by the level information may be one of the levels within the level range determined for that particular map tile. In some implementations, level determination module 110 may be configured such that the level ranges for the map tiles are determined based on the colors of the graphic representation received as the tile type information. A first color may indicate the first range and a second color may indicate the second range.

As described in the above use cases relating to FIG. 2, the colors of blocks 202a, 202b, and 202c may respectively indicate mountain map tiles, lake map tiles, and plain map tiles. In one use case, the colors of blocks 202a, 202b, 202c may indicate that the mountain map tiles, the lake map tiles, and the plain map tiles may each be associated with 15 different levels within levels 1-15. In another use case, the color of block 202a may indicate that the mountain map tiles may be associated with 15 different levels within the range of levels 1-15, the color of block 202b may indicate that the lake map tiles may be associated with 10 different levels within the range of levels 1-10, and the color of block 202c may indicate that the plain map tiles may be associated with 12 different levels within the range of levels 1-12. Level information for the map tiles may be determined such that the levels for the different types of map tiles may be within their respective level ranges as determined for those types of map tiles.

Map generation module 112 may be configured to generate the map based on the tile type information and the level information. With respect to the above use cases relating to FIG. 2, where the colors of blocks 202a, 202b, and 202c respectively indicate mountain map tiles, lake map tiles, and plain map tiles, the map may be generated such that the mountain map tiles may include shorter mountains as the mountain map tiles approach plain map tiles to reflect the levels assigned to the mountain map tiles. In a further use case, at least some of the mountain map tiles and the plain map tiles that are adjacent to (or otherwise proximate) the lake map tiles may include land and water (or other characteristics) to reflect the mountains of the mountain map tiles and the plains of the plain map tiles meeting the water of the lake map tiles. The inclusion of the land and water in the mountain map tiles and the plain map tiles may, for instance, be based on a determination that the lake map tiles are adjacent to or otherwise proximate those mountain map tiles and those lake map tiles.

As discussed, in certain implementations, the tile type information may be received as a graphic representation having colors that indicate the tile types. In some implementations, the graphic representation may include pixels that represent the map tiles. Individual ones of the pixels may, for instance, represent individual ones of the map tiles. Map generation module 112 may be configured to generate the map based on the individual pixel representations of the individual map tiles. By way of example, for each pixels of the graphic representation, map generation module 112 may generate a map tile corresponding to the pixel. The map tile may be generated based on the tile type indicated by the color of the pixel, the proximate tile types indicated by other pixels determined to be proximate the pixel, the level assigned to the map tile in accordance with the proximate tile types, and/or other information derived from the pixel representations. By way of another example, map generation module 112 may arrange the map tiles corresponding to the pixels on the map based on the relative positions of the pixels on the graphic representation.

In various implementations, map generation module 112 may be configured to provide a user interface for presentation to a user (e.g., an administrator, a designer, etc.). The user interface may be configured to facilitate modification of the generated map by the user. For example, the user interface may enable the user to adjust individual levels of the map tiles on the generated map, change individual tile types of the map tiles on the generated map, add resources that can be collected or controlled by users of a virtual space to the map tiles on the generated map, fine tune other characteristics of the map tiles on the generated map, and/or perform other modifications with respect to the generated map.

It is noted that, in some implementations, the map may be generated for use with a game space and/or other virtual spaces. An instance of a virtual space may be executed by computer modules to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user character being controlled by a user via client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may include a 2-dimensional topography. In other instances, the topography may include a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or one another. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with one another through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

Server(s) 102, client computing platforms 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 114, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 114, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 114 may include sources of information, hosts and/or providers of virtual spaces outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may include electronic storage media that electronically stores information. In some implementations, the electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platforms 104, and/or other information that enables server(s) 102 and/or client computing platforms 104 to function as described herein. It should be noted that, in certain implementations, electronic storage 116 may be a part of server(s) 102, a part of a given client computing platform 104, and/or a separate component of system 100.

In some implementations, processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118. As noted, in certain implementations, a given client computing platform 104 may include one or more computer program modules that is the same as or similar to the computer program modules of server(s) 102. Client computing platform 104 may include one or more processors that are the same or similar to processor(s) 118 of server(s) 102 to execute such computer program modules of client computing platform 104.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 3:
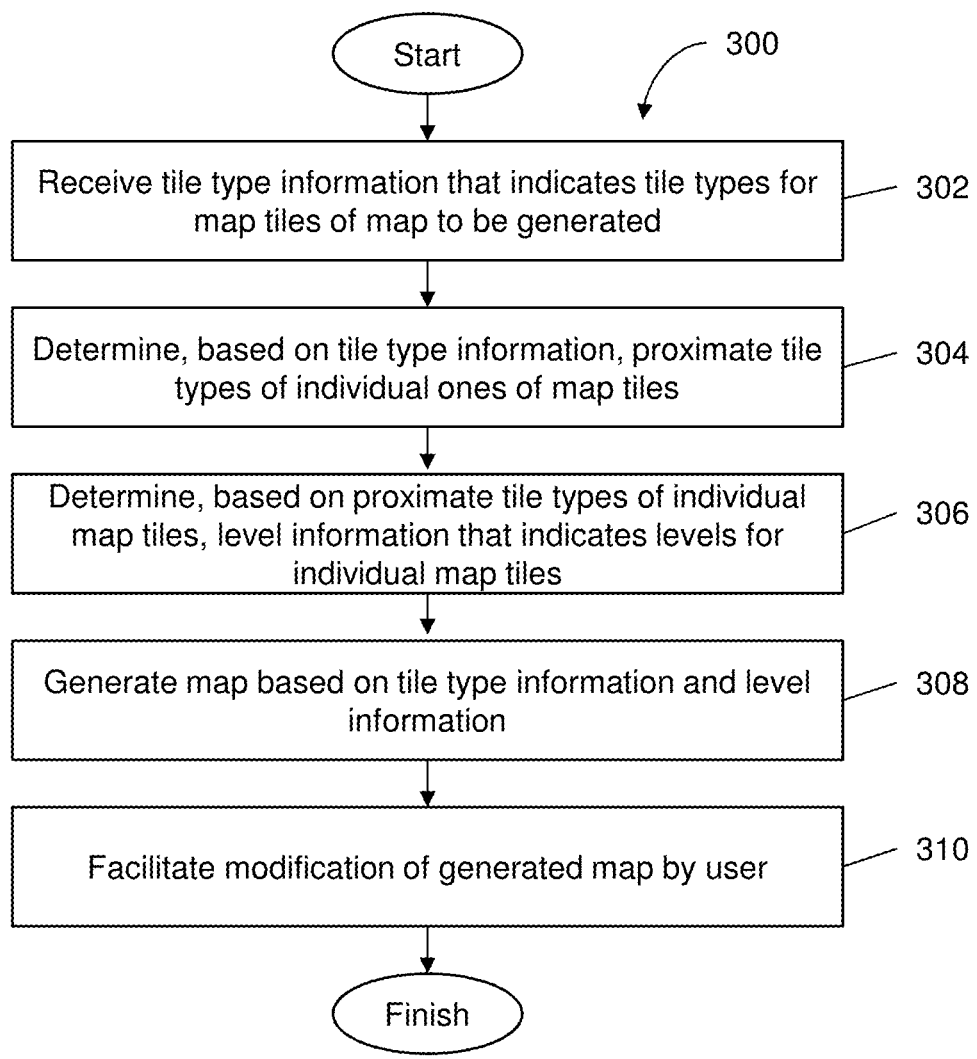
FIG. 3 illustrates a method for facilitating proximate-tile-type-based map generation, in accordance with one or more implementations.

FIG. 3 illustrates a method for facilitating proximate-tile-type-based map generation, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, tile type information that indicates tile types for map tiles of a map to be generated may be received. The tile types may include a first tile type and a second tile type. The map tiles may include a first map tile of the first tile type and a second map tile of the second tile type that is proximate the first map tile on the map. In some implementations, the tile types may include different terrain types. The terrain types may include a first terrain type and a second terrain type that is different from the first terrain type. The first tile type may include the first terrain type. The second tile type may include the second terrain type. Operation 302 may be performed by a tile type input module that is the same as or similar to tile type input module 106, in accordance with one or more implementations.

In certain implementations, the tile type information may be received as a graphic representation having colors that indicate the tile types. For example, the color may include a first color and a second color. The first color may indicate the first tile type. The second color may indicate the second tile type. In some implementations, the graphic representation may include pixels that represent the map tiles such that individual ones of the pixels represent the individual map tiles. Receiving of the tile type information as the graphic representation may be performed by a tile type input module that is the same as or similar to tile type input module 106, in accordance with one or more implementations.

At an operation 304, one or more proximate tile types of individual ones of the map tiles may be determined based on the tile type information. The proximate tile types of the individual map tiles may include one or more of the tile types of other ones of the map tiles that are proximate the individual map tiles on the map. For example, if the second map tile is proximate the first map tile, the second tile type may be determined to be one of the proximate tile types of the first map tile. Operation 304 may be performed by a tile type proximity module that is the same as or similar to tile type proximity module 108, in accordance with one or more implementations.

In various implementations, the map may include map tile sets having the map tiles. The map tile sets may include a first map tile set and a second map tile set. The first map tile set may include one or more tiles of the first tile type. The map tiles of the first map tile set may include the first map tile. The second map tile set may include one or more tiles of the second tile type. The map tiles of the second map tile set may include the second map tile. In some implementations, the second tile type may be determined to be one of the proximate tile types of the first map tile based on a determination that the second map tile set is adjacent to the first map tile set on the map. Determination of the second tile type as one of the proximate tile types of the first map tile may be performed by a tile type proximity module that is the same as or similar to tile type proximity module 108, in accordance with one or more implementations.

At an operation 306, level information that indicates levels for the individual map tiles may be determined based on the proximate tile types of the individual map tiles. For example, a level indicated by the level information for the first map tile may be based on a determination that the second tile type is one of the proximate tile types of the first map tile. The second tile type may be determined to be one of the proximate tile types of the first map tile based on a determination that the second map tile is proximate the first map tile. Operation 306 may be performed by a level determination module that is the same as or similar to level determination module 110, in accordance with one or more implementations.

In certain implementations, the level information may be determined such that the levels for the individual map tiles may be based on one or more levels indicated by the level information for the other map tiles that are proximate the individual map tiles. For example, the map tiles may include the first map tile of the first tile type, a second map tile of the second tile type, and a third map tile of the first tile type. The level information may be determined such that the level for the first map tile is based on one or more of a level indicated by the level information for the second map tile or a level indicated by the level information for the third map tile.

In various implementations, level ranges for the map tiles may be determined. The level information may be determined such that the levels indicated by the level information for the individual map tiles may be based on the level ranges of the individual map tiles. In some implementations, the level ranges for the map tiles may be determined based on the colors of the graphic representation received as the tile type information. For example, a first color may indicate the first range and a second color may indicate the second range. The level indicated by the level information for the first map tile may be based on a determination that the first map tile is within the first range in accordance with the first color. The determination of the level information and/or the determination of the level ranges may be performed by a level determination module that is the same as or similar to level determination module 110, in accordance with one or more implementations.

At an operation 308, the map may be generated based on the tile type information and the level information. For example, the map tiles of the generated map may be of the tile types indicated by the tile type information. The map tiles of the generated map may be of the levels indicated by the level information. As noted, in certain implementations, the tile type information may be received as a graphic representation that includes pixels representing the map tiles. Individual ones of the pixels may, for instance, represent the individual map tiles. In some implementations, the map may be generated based on the individual pixel representations of the individual map tiles. Operation 308 may be performed by a map generation module that is the same as or similar to map generation module 112, in accordance with one or more implementations.

At an operation 310, modification of the generated map by a user may be facilitated. For example, a user interface that is configured to facilitate the modification of the generated map by the user may be presented to user. The user interface may, for instance, enable the user to adjust individual levels of the map tiles on the generated map, change individual tile types of the map tiles on the generated map, add resources that can be collected or controlled by users of a virtual space to the map tiles on the generated map, fine tune other characteristics of the map tiles on the generated map, and/or perform other modifications with respect to the generated map. Operation 310 may be performed by a map generation module that is the same as or similar to map generation module 112, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating proximate-tile-type-based map generation, the system comprising:
    one or more processors configured by machine-readable instructions to:
        receive a graphical representation of a user-generated map, the graphical representation comprising a plurality of sets of pixels, each set of pixels of the plurality of sets of pixels corresponding to a different map tile from a set of map tiles;
        determine tile type information for each map tile of the set of map tiles based at least in part on colors included in a corresponding portion of the graphical representation for the map tile, the tile type information indicating tile types for the set of map tiles of a map of a game space to be generated, wherein the tile types include a first tile type and a second tile type, and the set of map tiles include a first map tile of the first tile type and a second map tile of the second tile type that is proximate the first map tile on the map, and wherein each tile type is associated with a different color or set of colors;
        determine, based on the tile type information, one or more proximate tile types of individual ones of the set of map tiles, wherein the proximate tile types of the individual map tiles include one or more of the tile types of other ones of the set of map tiles that are proximate the individual map tiles on the map;
        determine, based on the proximate tile types of the individual map tiles, numeric values for levels of the individual map tiles such that the levels dictate the degree to which characteristics of a tile type assigned to an individual map tile are present in the individual map tile, wherein a level indicated by the numeric value for the first map tile is based on a determination that the second tile type is one of the proximate tile types of the first map tile;
        associate game-specific terrain characteristics with at least some map tiles of the set of map tiles based at least in part on the tile type information and the numeric values, wherein the game-specific terrain characteristics comprise tile properties that affect in-game actions performed with respect to the at least some map tiles; and
        generate the map based on the tile type information and the numeric values.

2. The system of claim 1, wherein the tile types include different terrain types, the terrain types include a first terrain type and a second terrain type different from the first terrain type, the first tile type includes the first terrain type, and the second tile type includes the second terrain type.

3. The system of claim 1, wherein the set of map tiles include a third map tile of the first tile type that is proximate the first map tile on the map, and wherein the one or more processors are further configured by machine-readable instructions to determine the numeric values such that the level for the first map tile is based on one or more of a level indicated by the numeric value for the second map tile or a level indicated by the numeric value for the third map tile.

4. The system of claim 1, wherein the map includes map tile sets having one or more map tiles, the map tile sets includes a first map tile set and a second map tile set, the first map tile set includes one or more tiles of the first tile type, the map tiles of the first map tile set includes the first map tile, the second map tile set includes one or more tiles of the second tile type, and the map tiles of the second map tile set includes the second map tile, and wherein the one or more processors are further configured by machine-readable instructions to determine that the second tile type is one of the proximate tile types of the first map tile based on a determination that the second map tile set is adjacent to the first map tile set on the map.

5. The system of claim 1, wherein the first map tile includes a first color and the second map tile includes a second color, the first color indicates the first tile type, and the second color indicates the second tile type.

6. The system of claim 5, wherein the one or more processors are further configured by machine-readable instructions to:

determine, based on the colors, level ranges for the set of map tiles, wherein the level ranges include a first range and a second range; and determine the numeric values such that the level for the first map tile is based on a determination that the first map tile is within the first range in accordance with the first color.

7. The system of claim 1, wherein the one or more processors are further configured by machine-readable instructions such that the map is generated based on the individual pixel representations of the individual map tiles.

8. The system of claim 1, wherein the one or more processors are further configured to provide a user interface for presentation to a user, and wherein the user interface is configured to facilitate modification of the generated map by the user.

9. The system of claim 1, wherein the user-generated map comprises a manually drawn map.

10. The system of claim 1, wherein the one or more processors are further configured by machine-readable instructions to:

determine that the color of a particular map tile is a variation of the color of the tile type of the particular map tile; and adjust a numeric value of the level of the particular map tile based at least in part on the determined variation of the color of the tile type of the particular map tile.

11. A computer-implemented method of facilitating proximate-tile-type-based map generation, the method being implemented on a computer system that includes one or more physical processors, the method comprising:

receiving a graphical representation of a user-generated map, the graphical representation comprising a plurality of sets of pixels, each set of pixels of the plurality of sets of pixels corresponding to a different map tile from a set of map tiles;

determining tile type information for each map tile of the set of map tiles based at least in part on colors included in a corresponding portion of the graphical representation for the map tile, the tile type information indicating tile types for the set of map tiles of a map of a game space to be generated, wherein the tile types include a first tile type and a second tile type, and the set of map tiles include a first map tile of the first tile type and a second map tile of the second tile type that is proximate the first map tile on the map, and wherein each tile type is associated with a different color or set of colors;

determining, based on the tile type information, one or more proximate tile types of individual ones of the set of map tiles, wherein the proximate tile types of the individual map tiles include one or more of the tile types of other ones of the set of map tiles that are proximate the individual map tiles on the map;

determining, based on the proximate tile types of the individual map tiles, numeric values for levels of the individual map tiles such that the levels dictate the degree to which characteristics of a tile type assigned to an individual map tile are present in the individual map tile, wherein a level indicated by the numeric value for the first map tile is based on a determination that the second tile type is one of the proximate tile types of the first map tile;

associating game-specific terrain characteristics with at least some map tiles of the set of map tiles based at least in part on the tile type information and the numeric values, wherein the game-specific terrain characteristics comprise tile properties that affect in-game actions performed with respect to the at least some map tiles; and generating the map based on the tile type information and the numeric values.

12. The method of claim 11, wherein the tile types include different terrain types, the terrain types include a first terrain type and a second terrain type that is different from the first terrain type, the first tile type includes the first terrain type, and the second tile type includes the second terrain type.

13. The method of claim 11, wherein the set of map tiles include a third map tile of the first tile type that is proximate the first map tile on the map, and wherein the numeric values are determined such that the level for the first map tile is based on one or more of a level indicated by the numeric value for the second map tile or a level indicated by the numeric value for the third map tile.

14. The method of claim 11, wherein the map includes map tile sets having one or more map tiles, the map tile sets includes a first map tile set and a second map tile set, the first map tile set includes one or more tiles of the first tile type, the map tiles of the first map tile set includes the first map tile, the second map tile set includes one or more tiles of the second tile type, and the map tiles of the second map tile set includes the second map tile, and wherein the second tile type is determined to be one of the proximate tile types of the first map tile based on a determination that the second map tile set is adjacent to the first map tile set on the map.

15. The method of claim 11, wherein the first map tile includes a first color and the second map tile includes a second color, the first color indicates the first tile type, and the second color indicates the second tile type.

16. The method of claim 15, further comprising determining, based on the colors, level ranges for the set of map tiles, wherein the level ranges include a first range and a second range, and wherein the numeric values are determined such that the level for the first map tile is based on a determination that the first map tile is to be within the first range in accordance with the first color.

17. The method of claim 11, wherein the map is generated based on the individual pixel representations of the individual map tiles.

18. The method of claim 11, further comprising providing a user interface for presentation to a user, wherein the user interface is configured to facilitate modification of the generated map by the user.

19. The method of claim 11, wherein the user-generated map comprises a manually drawn map.

20. The method of claim 11, wherein the method further comprises:

determining that the color of a particular map tile is a variation of the color of the tile type of the particular map tile; and adjusting a numeric value of the level of the particular map tile based at least in part on the determined variation of the color of the tile type of the particular map tile.

* * * * *